US012762843B2

(12) United States Patent
Bai et al.

(10) Patent No.: US 12,762,843 B2
(45) Date of Patent: Oct. 13, 2026

(54) METHOD, APPARATUS, DEVICE AND MEDIUM FOR IMAGE PROCESSING

(71) Applicants: Lemon Inc., Grand Cayman (KY); Beijing Youzhuju Network Technology Co., Ltd., Beijing (CN)

(72) Inventors: Song Bai, Singapore (SG); Junhao Zhang, Singapore (SG); Heng Wang, Los Angeles, CA (US); Rui Yan, Beijing (CN); Chuhui Xue, Singapore (SG); Wenqing Zhang, Singapore (SG)

(73) Assignees: Lemon Inc., Grand Cayman (KY); Beijing Youzhuju Network Technology Co., Ltd., Beijing (CN)

( * ) Notice: Subject to any disclaimer, the term of this patent is extended or adjusted under 35 U.S.C. 154(b) by 163 days.

(21) Appl. No.: 18/394,249

(22) Filed: Dec. 22, 2023

(65) Prior Publication Data

US 2024/0144656 A1 May 2, 2024

(30) Foreign Application Priority Data

Jan. 6, 2023 (CN) ........................ 202310020033.1

(51) Int. Cl.
*G06V 10/774* (2022.01)
*G06V 10/40* (2022.01)
(Continued)

(52) U.S. Cl.
CPC ............ *G06V 10/774* (2022.01); *G06V 10/40* (2022.01); *G06V 10/761* (2022.01); *G06V 10/772* (2022.01); *G06V 10/82* (2022.01)

(58) Field of Classification Search
CPC .... G06V 10/774; G06V 10/40; G06V 10/761; G06V 10/772; G06V 10/82; G06V 10/764; G06N 3/045; G06N 3/08
See application file for complete search history.

(56) References Cited

U.S. PATENT DOCUMENTS

| | | | |
|---|---|---|---|
| 2017/0251212 | A1 | 8/2017 | Swaminathan et al. |
| 2021/0201003 | A1 | 7/2021 | Banerjee et al. |

(Continued)

FOREIGN PATENT DOCUMENTS

| | | | |
|---|---|---|---|
| CN | 1993976 | A | 7/2007 |
| CN | 110084281 | A | 8/2019 |

(Continued)

OTHER PUBLICATIONS

Zhao, Bo "Synthesizing Informative Training Samples with GAN" NeurIPS 2022 Workshop on Synthetic Data for Empowering ML Research. Dec. 21, 2022 (Year: 2022).*

(Continued)

*Primary Examiner* — Molly Wilburn
(74) *Attorney, Agent, or Firm* — Alleman Hall LLP

(57) ABSTRACT

A method, apparatus, device, and medium for image processing is provided. The method includes generating, using an image generation process, a first set of synthetic images based on a first set of codes associated with the first image class in a codebook and based on a first class feature associated with a first image class; generating, using a feature extraction process, a first set of reference features based on the first set of synthetic images and generating a first set of target features based on a plurality of sets of training images belonging to the first image class in a training image set; and updating the image generation process and the codebook according to at least a first training objective to reduce a difference between each reference feature in the first set of reference features and a corresponding target feature in the first set of target features.

20 Claims, 4 Drawing Sheets

(51) Int. Cl.

| | |
|---|---|
| ***G06V 10/74*** | (2022.01) |
| ***G06V 10/772*** | (2022.01) |
| ***G06V 10/82*** | (2022.01) |

(56) References Cited

U.S. PATENT DOCUMENTS

| | | | |
|---|---|---|---|
| 2022/0004803 | A1 | 1/2022 | Li et al. |
| 2022/0222532 | A1 | 7/2022 | Shu et al. |

FOREIGN PATENT DOCUMENTS

| | | | |
|---|---|---|---|
| CN | 11259967 | A | 6/2020 |
| CN | 112785661 | A | 5/2021 |
| CN | 114937268 | A | 8/2022 |

OTHER PUBLICATIONS

Wang, Kai "CAFE: Learning to Condense Dataset by Aligning Features" Proceedings of the IEEE/CVF Conference on Computer Vision and Pattern Recognition (CVPR), 2022 (Year: 2022).*

China National Intellectual Property Administration, Office action issued in CN application No. 202310020033.1, Aug. 21, 2026, 18 pages.

* cited by examiner

METHOD, APPARATUS, DEVICE AND MEDIUM FOR IMAGE PROCESSING

CROSS REFERENCE TO RELATED APPLICATIONS

The present application claims priority to Chinese Patent Application No. 202310020033.1, filed on Jan. 6, 2023, entitled "METHOD, APPARATUS, DEVICE AND MEDIUM FOR IMAGE PROCESSING", the entirety of which is incorporated herein by reference.

FIELDS

The example embodiments of the disclosure generally relate to the computer field, in particular to a method, apparatus, device, and computer-readable storage medium for image processing.

BACKGROUND

A deep neural network has achieved a great success in a wide range of computer vision and machine learning tasks, but it requires large-scale datasets to perform training and a plurality of parameter adjustments. Therefore, computing and environmental resources are heavily consumed. Some solutions attempt to reduce training costs by mining and compressing large-scale datasets. Traditional approaches usually rely on a subset of an original dataset, for example, including active learning for valuable sample labeling and coreset selection. However, these approaches are limited by the representation capability and coverage of the selected samples.

Another approach is called dataset condensation (DC) or dataset distillation (DD), which compresses large datasets into very few synthetic images, while maintaining expected results of a network trained on such a small set. Various solutions have been developed to improve dataset condensation, for example, including consistent network gradients, features, mutual information, and parameter trajectory of the synthetic set and the original set. All these solutions aim to compress the information contained in the original large dataset into a small set of synthetic images. However, the existing dataset condensation approaches have a slow condensation process have many parameters to be optimized, and is difficult to scale up to large datasets.

SUMMARY

In the first aspect of the disclosure, a method of image processing is provided. The method includes generating, using an image generation process, a first set of synthetic images based on a first set of codes in a codebook and based on a first class feature associated with a first image class, the first set of codes being associated with the first image class; generating, using a feature extraction process, a first set of reference features based on the first set of synthetic images and generating a first set of target features based on a plurality of sets of training images in a training image set, the plurality of sets of training images belonging to the first image class; and updating the image generation process and the codebook according to at least a first training objective to reduce a difference between each reference feature in the first set of reference features and a corresponding target feature in the first set of target features.

In a second aspect of the disclosure, an apparatus for image processing is provided. The apparatus includes an image generation module configured to generate, using an image generation process, a first set of synthetic images based on a first set of codes in a codebook and based on a first class feature associated with a first image class, the first set of codes being associated with the first image class; a feature extraction module configured to generate, using a feature extraction process, a first set of reference features based on the first set of synthetic images and generate a first set of target features based on a plurality of sets of training images in a training image set, the plurality of sets of training images belonging to the first image class; and an update module configured to update the image generation process and the codebook according to at least a first training objective to reduce a difference between each reference feature in the first set of reference features and a corresponding target feature in the first set of target features.

In a third aspect of the disclosure, an electronic device is provided. The device includes at least one processing unit; and at least one memory coupled to the at least one processing unit and storing instructions for execution by the at least one processing unit. The instructions, upon the execution by the at least one processing unit, cause the device to perform the method according to the first aspect.

In a fourth aspect of the disclosure, a computer-readable storage medium is provided. The computer-readable storage medium stores a computer program thereon, the computer program being executed by a processor to perform the method according to the first aspect.

It should be understood that the content described in the summary section of the disclosure is not intended to limit the key features or important features of the embodiments of the disclosure, nor to limit the scope of the disclosure. Other features of the disclosure will be readily understood by the following description.

BRIEF DESCRIPTION OF THE DRAWINGS

The above and other features, advantages and aspects of the embodiments of the disclosure will become more apparent in combination with the accompanying drawings and with reference to the following detailed description. In the drawings, the same or similar reference numerals represent the same or similar elements, wherein.

DETAILED DESCRIPTION

Figure 1:
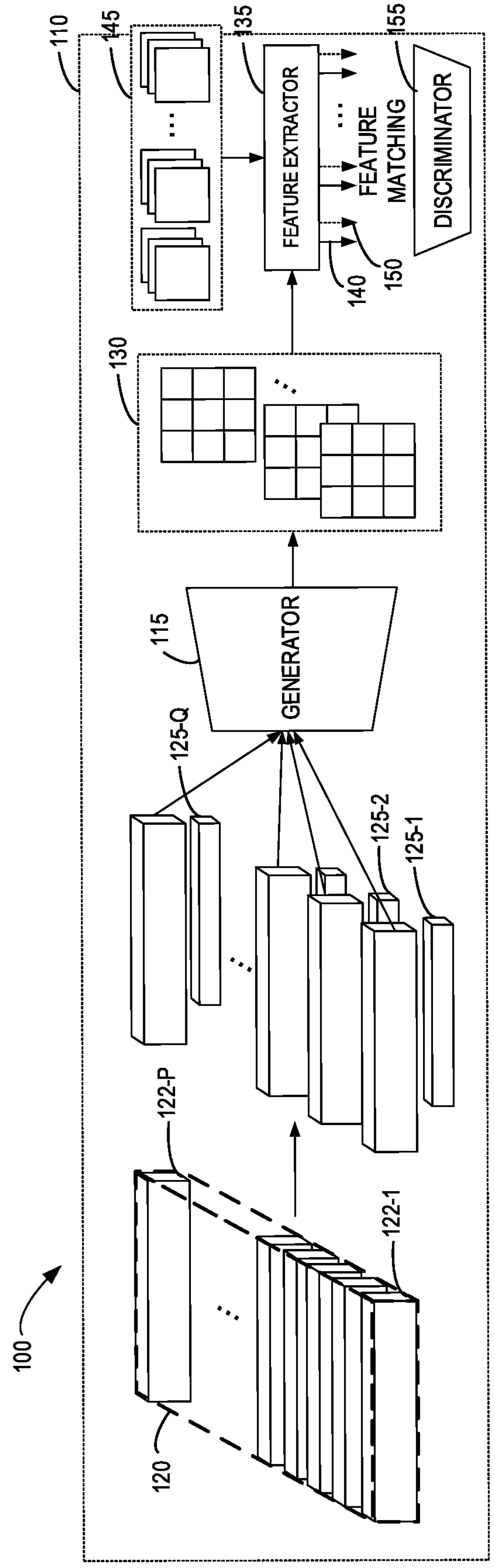
FIG. 1 shows a schematic diagram of an example environment in which the embodiments of the disclosure may be applied.

Embodiments of the disclosure will be described in more detail below with reference to the accompanying drawings. Although some embodiments of the disclosure are shown in the accompanying drawings, it should be understood that the disclosure may be implemented in various forms, and should not be interpreted as limited to the embodiments described herein. On the contrary, these embodiments are provided for a more thorough and complete understanding of the disclosure. It should be understood that the drawings and embodiments of the disclosure are only for illustrative purposes and are not intended to limit the protection scope of the disclosure.

In the description of the embodiments of this disclosure, the term "including" and similar terms should be understood as open inclusion, that is, "including but not limited to". The term "based on" should be understood as "at least partially based on". The terms "one embodiment" or "the embodiment" should be understood as "at least one embodiment". The term "some embodiments" should be understood as "at least some embodiments". Other explicit and implicit definitions may also be included below.

It is understood that the data involved in this technical solution (including but not limited to the data itself, data acquisition or use) shall comply with the requirements of corresponding laws and relevant regulations.

It is to be understood that before using the technical solutions disclosed in the embodiments of the disclosure, users should be informed of a type, a use scope, use scenarios, and/or the like of the personal information involved in the disclosure in an appropriate manner in accordance with relevant laws and regulations, and the user's authorization should be obtained.

For example, in response to receiving the user's active request, prompt information is sent to the user to explicitly prompt the user that the operation requested by the user will need to obtain and use the user's personal information. Thus, according to the prompt information, the user may select whether to provide personal information to software or hardware such as electronic devices, applications, servers or storage media that perform the operation of the technical solution of the disclosure.

As an optional but non-limited implementation, in response to the user's active request, a way of sending the prompt information to the user may be, for example, a pop-up window in which the prompt information may be presented in text. In addition, pop-up windows may further contain selection controls for users to choose "agree" or "disagree" to provide personal information to electronic devices.

It is to be understood that the above processes of notification and user authorization acquisition are only illustrative and does not limit the implementations of the disclosure. Other approaches that meet relevant laws and regulations may also be applied to the implementations of the disclosure.

As used herein, the term "model" may learn the association between corresponding inputs and outputs from training data, so that corresponding outputs may be generated for a given input after training. The model generation may be based on machine learning technology. Deep learning is a machine learning algorithm that uses a plurality of layers of processing units to process inputs and provide corresponding outputs. The neural network model is an example of a model based on deep learning. Herein, "model" may also be referred to as "machine learning model", "learning model", "machine learning network" or "learning network", and these terms are used interchangeably.

"Neural network" is a machine learning network based on deep learning. The neural network may process inputs and provide corresponding outputs, which usually includes an input layer, an output layer and one or more hidden layers between the input layer and the output layer. Neural networks used in deep learning applications usually include many hidden layers, thus increasing the depth of the network. The respective layers of the neural network is connected sequentially, so that the output of the previous layer is provided as the input of the next layer, where the input layer receives the input of the neural network, and the output of the output layer is used as the final output of the neural network. Each layer of the neural network includes one or more nodes (also known as processing nodes or neurons), and each node processes the input from the upper layer.

Generally, machine learning may include three stages, namely a training stage, a testing stage and an application stage (also known as a reasoning stage). In the training phase, the given model may be trained with a large number of training data to update the parameter values iteratively until the model may obtain, from the training data, consistent reasoning that meets the expected objectives. Through training, the model may be considered to be able to learn, from training data, the association between input and output (also known as input to output mapping). The parameter values of the trained model are determined. In the test phase, the test input is applied to the trained model to test whether the model may provide correct output, so as to determine the performance of the model. In the application phase, the model may be used to process the actual input and determine the corresponding output based on the parameter values obtained from the training.

Dataset condensation technology has made progress in many applications, including data privacy, neural architecture searching, federated learning and continuous learning. Training results may be improved by replacing optimization objectives or using effective optimization approaches. Important optimization objectives help to synthesize information images. Optimization objectives include, for example, trajectory matching, distribution and feature alignments, as well as valuable optimization adjustments, such as synthetic data parameterization, neural feature regression, soft labels, infinite width convolution networks, contrastive signals and differentiable siamese augmentation, etc. In addition, another solution proposes to factorize synthetic images into image basis and several coefficients to be retrieved.

Dataset condensation aims to compress a large dataset with a large number of training samples into a small set. The selection of coreset or subset is a typical way to reduce the overall size of the training set. This approach generally performs incremental selections of key data points based on heuristic selection criteria. For example, in the training process of the network, the forgettability of the training samples may be evaluated and the unforgettable samples may be eliminated. It may further be attempted to get as many samples as possible in the gradient space. Data points that are close enough to the cluster center may be selected for consideration. However, this approach cannot guarantee that the selected subset is optimal for the training model using these heuristic selection criteria, because they are not designed for deep neural networks. In addition, greedy sample selection algorithms cannot guarantee that the selected subset is the best subset meeting the requirements of the criteria.

Large datasets may be condensed into very few synthetic images through dataset condensation or dataset distillation to obtain small datasets. Traditionally, information is generally condensed into a pixel format. This condensation process has a slow optimization speed and has many parameters to be optimized, which causes it difficult to scale up to large datasets. This is because the traditional approach attempts to distill the information of the original dataset directly into pixels by treating each pixel of the synthetic image as a learnable parameter, where the number of parameters is proportional to the resolutions and the number of classes. For example, 1K classes, 128×128 resolutions and 10 images per class will result in up to 1.5 G parameters. The image resolution and the number of classes are increased, the number of learnable parameters will be increased accordingly. The back propagation of a large number of parameters causes the optimization process extremely slow. Moreover, it is difficult to optimize such a large number of parameters, which causes it difficult to scale the dataset condensation approach up to large datasets, such as ImageNet-1K.

In addition, since the network for data extraction is usually optimized towards intra-class compactness, the distribution of synthetic images in each class tends to be clustered into a compact small region. Therefore, the feature distribution of condensed samples is often not diverse enough. This lack of diversity causes a small number of synthetic images unable to be representative enough, thereby leading to easy overfitting in training on condensed datasets.

The embodiment of the disclosure proposes an image condensation solution, which uses a generation model consisting of an image generation process and an information carrier codebook to condense a large dataset. With the assistance of GAN, the generator may be used to perform the image generation process. The codebook is learnable, in which each code may be a one-dimensional (1D) learnable vector. The codebook contains the condensed information of the original image and may be shared by different classes of images.

To generate a synthetic image, a code may be sampled from a learnable codebook and the sampled code may be used to generate an image containing condensed information. The image generation process is conditional on class features, which are associated with image classes. The synthetic image may be controlled to be specific to a certain image class.

The traditional data condensation approach directly condenses the information of large datasets into synthetic images. This direct condensation requires that each pixel in the image or image basis is regarded as a learnable parameter, and the number of parameters increases linearly with the increase of the number of classes and the resolutions. This hinders the scalability of datasets with different classes. Instead of directly optimizing the synthetic image or image basis, according to the solution of the embodiment of the disclosure, the image information is condensed into a generation model, and the generation model with a learnable codebook is used to synthesize the image. The size of the generation model will not change significantly with the increase of the number of classes or the image resolutions. In this way, the number of learnable parameters will be rarely affected by the increase of the classes and the resolutions. This condensation approach allows condensation of datasets with different classes and higher resolutions, which improves the condensation efficiency of datasets.

FIG. 1 shows a schematic diagram of an example environment 100 in which an embodiment of the disclosure may be implemented.

The environment 100 includes an electronic device 110 configured to perform image set condensation. The electronic device 110 may be implemented at a terminal device. The terminal device may be any type of mobile terminals, fixed terminals or portable terminals, including mobile phones, desktop computers, laptop computers, netbook computers, tablet computers, media computers, multimedia tablets, personal communication system (PCS) devices, personal navigation devices, personal digital assistants (PDAs), audio/video players, digital cameras/video cameras, positioning devices, TV receivers, radio broadcast receivers, e-book devices, game devices or any combination of the foregoing, including accessories and peripherals of these devices or any combination thereof. In some embodiments, the terminal device may further support any type of user specific interfaces (such as a "wearable" circuit, etc.).

Alternatively, the electronic device 110 may be implemented at a server. The server may be implemented by any type of devices, including virtual and physical devices. Examples of such devices may include, but be not limited to, mainframes, edge computing nodes, rack servers, router computers, server computers, personal computers, large computers, laptop computers, tablet computers, desktop computers, and the like. In some embodiments, the device may include a virtual machine, a container, or a bare metal server.

As shown in FIG. 1, the electronic device 110 may include a generator 115, which may be configured to implement an image generation process. Using the image generation process, based on the codes 122-1 . . . 122-P (individually or collectively referred to as code(s) 122) associated with plurality of image classes in the learnable (or trainable) codebook 120 and based on the class features 125-1, 125-2 . . . 125-Q (individually or collectively referred to as class feature(s) 125) associated with a plurality of image classes, a synthetic image 130 associated with each image class is generated, where P and Q represent any appropriate positive integers.

The electronic device 110 may further include a feature extractor 135, which may be configured to implement a feature extraction process. Using the feature extraction process, the reference feature 140 is generated based on the synthetic image 130 of each class, and the target feature 150 is generated based on the training image 145 of each class. In various embodiments of the disclosure, the generation process and the codebook 120 are updated according to a training objective to reduce a difference between the reference feature 140 and the corresponding target feature 145.

In some embodiments, as shown in FIG. 1, the electronic device 110 may include a discriminator 155, which may be configured to implement an image discrimination process to distinguish similarity between the synthetic image 130 and the training image.

It should be understood that the structure and composition of the environment 100 are shown in FIG. 1 only for the purpose of illustration, without suggesting any limitation on the scope of the disclosure.

It is also to be understood that the structure of the electronic device 110 is shown in FIG. 1 only for the illustrative purposes only without implying any limitation. Although the generator 115, the feature extractor 135, and the discriminator 155 are shown to be separated from each other, two or more of them may be integrated into one entity or module. In addition, the electronic device 110 may further include any other suitable units, modules and/or components for implementing corresponding functions.

It should also be understood that devices, units, modules, components and/or elements in electronic device 110 may be implemented in a variety of ways, including software, hardware, firmware, or any combination thereof. In some applications, the generator 115 and the discriminator 155 may be implemented based on GAN. The feature extractor 135 may be implemented based on a convolutional neural network.

Figure 2:
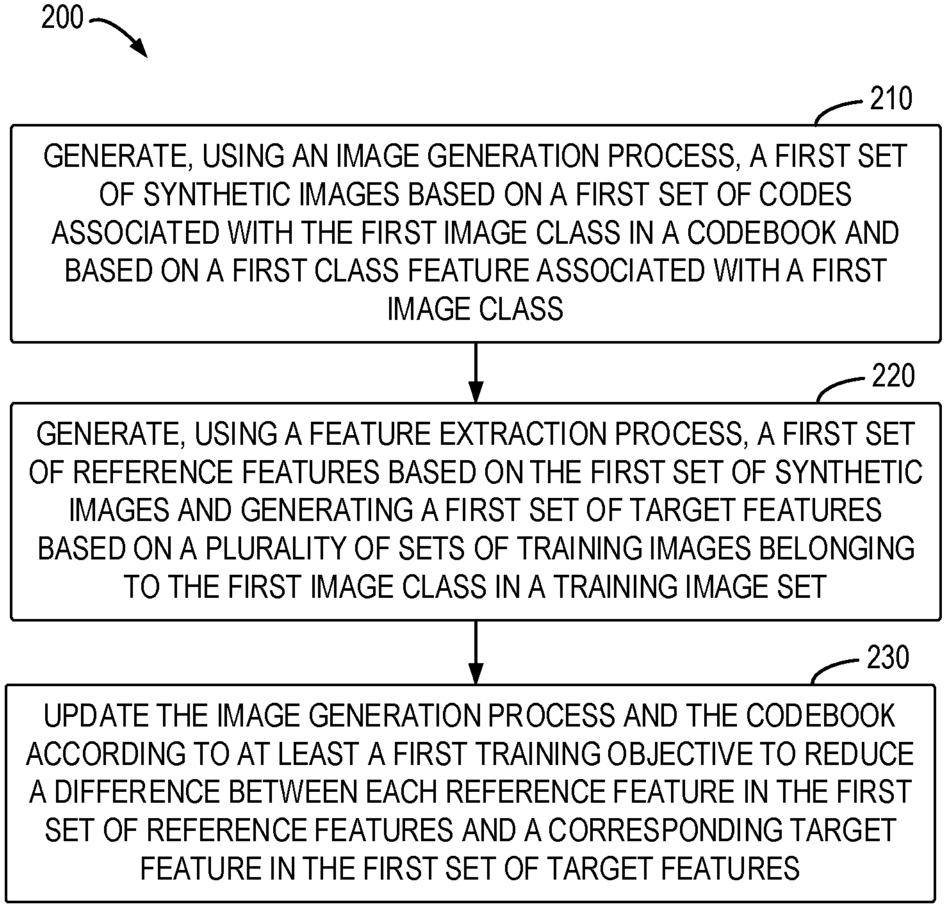
FIG. 2 shows a flowchart of a process of image processing according to some embodiments of the disclosure.

FIG. 2 shows a flowchart of a process 200 of image processing according to some embodiments of the disclosure. The process 200 may be implemented at the electronic device 110. For the purpose of discussion, the process 200 will be described with reference to the environment 100 in FIG. 1.

At block 210, using an image generation process (for example, through the generator 115 in FIG. 1), a first set of synthetic images are generated based on a first set of codes 122 associated with a first image class in the codebook 120 and based on a first class feature associated with the first image class (for example, the class feature 125-1 in FIG. 1).

As an example, the learnable codebook 120, as the information carrier, may be expressed as $Z \in \mathbb{R}^{K \times C}$, where K represents the number of each class of images and C represents the potential dimension. Different from the way that the condensed image is regarded as a learnable parameter and directly optimized, the number of learnable parameters is no longer proportional to the number of classes and the spatial resolutions by using a learnable codebook. This causes it possible to condense datasets with a large number of different classes. Since different classes share the same codebook, the learned codebook contains valuable mutual information across class, which is highly representative.

The information squeezed code 122 included in the codebook 120 may be represented as Z. Given the sampled code from Z, the generator 115 may acquire the squeezed information in the code, and thereby synthesize an informative image instead of a real image. The class features are further input to the generator 115, which may be used to characterize corresponding image classes. The class features may be implemented in any appropriate form, such as embeddings. Using more informative class feature instead of one-time labels may enable the generator to generate a large amount of condensed information.

In some embodiments, using the feature extraction process (for example, through the feature extractor 135 in FIG. 1), the corresponding features belonging to the first image class may be extracted from the respective training image in the training image set. Based on the corresponding features of the respective training images, a first class feature associated with the first image class is generated. As an example, an average feature of the respective training images of the same class may be taken as the corresponding class feature. For example, the lowest resolution features of the trained feature extractor 135 may be extracted and spatially pooled, and an average value per class in the training image set may be calculated.

In some embodiments, the class feature may be cascaded with the corresponding code as the input of the image generation process. For example, one synthetic image in the first set of synthetic images is generated based on the concatenated first class feature and corresponding code in the first set of codes (for example, the code 122-1 in FIG. 1). As an example, a projection layer may be applied to balance the class feature with the code Z, which then are concatenated together as an input to the generator 115.

According to the embodiment of the disclosure, in order to cause the synthetic image more informative and representative, feature matching is used as a first training objective to update the image generation process and the codebook 122. As shown in FIG. 2, at block 220, using the feature extraction process (for example, through the feature extractor 135 in FIG. 1), a first set of reference features (for example, the reference feature 140 in FIG. 1) is generated based on the first set of synthetic images, and a first set of target features (for example, the target feature 150 in FIG. 1) is generated based on a plurality of sets of training images belonging to the first image class in the training image set. At block 230, the image generation process and codebook are updated at least according to the first training objective to reduce the difference between each reference feature in the first set of reference features and the corresponding target feature in the first target feature.

A target feature in the first set of target features may be generated based on a set of training images in plurality of sets of training images by using the feature extraction process. The set of training images may be randomly selected from the training image set or selected from the training image set in other ways.

For example, given a large training dataset $$\mathcal{T} = \{(x_i, y_i)\}_{i=1}^{|\mathcal{T}|}$$

with a large number of training samples $x_i$ and corresponding labels $y_i$, a small synthetic set $$\mathcal{S} = \{(\tilde{x}_i, \tilde{y}_i)\}_{i=1}^{|\mathcal{T}|}$$

may be obtained by condensing the dataset, where its size $|\mathcal{S}|$ much smaller than the size $|\mathcal{T}|$ of the large dataset. For each synthetic image, the number of original images belonging to the same class may be large. In this case, a subset of the original image may be randomly sampled. Random sampling may be performed per batch.

A synthetic image and its associated set of training images may be respectively passed through the feature extractor 135. As an example, the feature extractor 135 may be implemented based on a multilayer neural network, for example, represented as $\phi_\theta$. Then, the features $$f_l^{\mathcal{S}}$$

of $\tilde{x}$ from each layer l of the network and the average features $$\bar{f}_k^{\mathcal{T}}$$

of the associated training image may be obtained. The mean square error (MSE) may be used to calculate the feature distribution matching loss $\mathcal{L}_f$ between the synthetic image and the original image of each layer as the first training objective. As an example, the loss may be calculated as follows:

$$\mathcal{L}_f = \sum_{i=1}^{L} |f_l^{\mathcal{S}} - \bar{f}_k^{\mathcal{T}}|^2 \tag{1}$$

The image generation process and the codebook may be optimized by minimizing the loss $\mathcal{L}_f$ to meet the first training goal.

In this way, instead of directly condensing information into pixels, the solution according to the embodiment of the disclosure distills the information into a learnable information carrier codebook and an image generation process. The class feature and the associated code pass through the image generation process together, thereby squeezing information synthesizing information images. This approach may easily be scaled up to large datasets with different classes.

In addition, as mentioned above, the feature distribution of condensed samples obtained through traditional dataset condensation approaches is often not diverse enough, causing training on condensed datasets easy to fall into the overfitting issues. According to some embodiments of the disclosure, considering the relationship between condensed samples, intra class losses are used to simulate the relationship between condensed samples, so as to improve the representation ability and the generalization ability of condensed datasets. In some embodiments, the image generation process and the codebook may be further updated according to a second training objective to increase the differences between the first set of reference features belonging to the same class and reduce the difference between each reference feature in the first set of reference features and the first class feature.

As an example, any two synthetic images of the same class may be regarded as a pair of negative samples, so that their features are far away from each other, thus creating more diverse samples for each class. At the same time, the distribution scope of each class is constrained to avoid excessively wide distribution of samples of one class. A class center may be introduced for each class, which is represented by a class feature. Each sample and its corresponding class center form a positive pair, and the feature of the sample will be pulled closer to the class center.

Figure 3A:
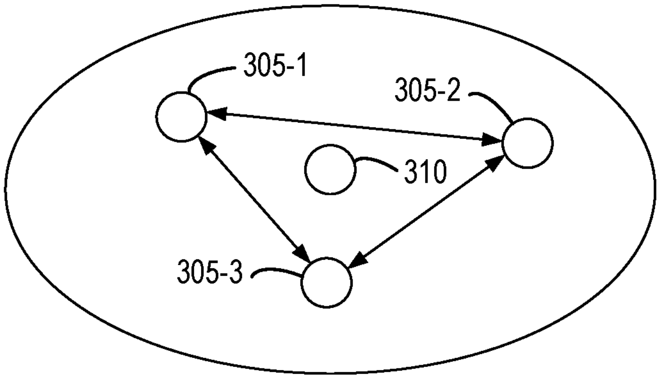
FIG. 3A shows a schematic diagram of an example process of increasing intra-class diversity according to some embodiments of the disclosure.

Using these two types of pairs, the following balance may be achieved, that is, the features of the same class of samples are sufficiently diverse, but they may still be distinguished from the features of other classes. As shown in FIG. 3A, the distances between samples 305-1, 305-2, and 305-3 of the same class are widened, while the distance between each sample 305-1, 305-2, and 305-3 and a class center 310 the is narrowed.

The intra-class diversity loss may be calculated as follows:

$$L_{intra} = -\log\frac{e\left(\langle f^S, c(y)\rangle\right)}{\sum_{i=1}^{K-1} e\left(\langle f^S, f_i^{S_y}\rangle\right) + e\left(\langle f^S, c(y)\rangle\right)} \quad (2)$$

where e represent $$\exp\left(\frac{\cdot}{\tau}\right),$$

$\langle\rangle$ represents dot product, $f^S$ represents the features of the synthetic image $\tilde{x}$ obtained from the last layer of the feature extraction network $\phi_\theta$. c(y) represents the class feature, and $$f_i^{S_y}$$

represents the feature of another sample with the same class as $\tilde{x}$. The image generation process and the codebook may be optimized by minimizing the intra-class diversity loss to meet the second training objective. In this way, the synthetic samples of the same class are dispersed and not too far away from their respective class centers.

Figure 3B:
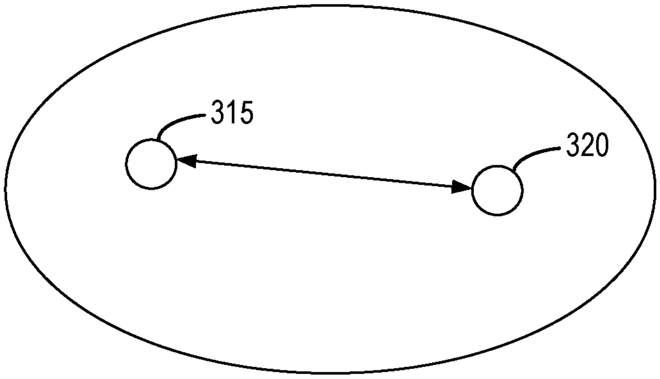
FIG. 3B shows a schematic diagram of an example process of increasing inter-class discrimination according to some embodiments of the disclosure.

In order to further distinguish different classes of synthetic image samples from each other more easily, in some embodiments, inter-class losses are further used to simulate the relationship between condensed samples. For example, the image generation process may be used to generate a second set of synthetic images associated with a second image class based on the second class feature and a second set of codes associated with a different second image class, and generate a second set of reference features based on the second set of synthetic images. The image generation process and the codebook may be further updated according to a third training objective to increase the differences between the first set of reference features and the second set of reference features. As shown in FIG. 3B, the distances between samples 315 and 320 of different classes are widened. In this way, a margin between the feature distributions of different classes may be enlarged, so that it is easier to distinguish samples.

As an example, the inter-class discrimination loss may be calculated as follows:

$$L_{inter} = \sum_{\substack{c_A=1 \\ c_A \neq c_B}}^{C} \sum_{c_B=1}^{C} \max\left(\tau_m - \left\|\bar{f}^{S_{c_A}} - \bar{f}^{S_{c_B}}\right\|, 0\right) \quad (3)$$

where $$\bar{f}^{S_{c_B}} \text{ and } \bar{f}^{S_{c_A}}$$

represent the average values of different classes of synthetic image features, which may be determined per batch of synthetic images. When the distance between the centers of two classes of synthetic images is greater than a margin $\tau_m$, the penalty is zero. The inter-class loss enlarges the distance between samples of different classes. For example, the average center of each class is caused far away from other classes, so that samples of different classes are more distinctive, and samples may be more easily distinguished. The resulting condensed dataset may have greater diversity and wider information coverage.

In some embodiments, the features of the image, rather than the image itself, may be used as an input to the image discrimination process (for example, discriminator 155 in FIG. 1), which enables the feature distribution of the synthetic image to better align or cover the distribution of the original dataset. For example, the image discrimination process may be used to determine at least the similarity between the first set of synthetic images and the training image belonging to the first image class based on the first set of reference features generated from the first set of synthetic images and based on the first set of target features generated from the corresponding plurality of sets of training images. The image generation process and the codebook may be further updated according to a fourth training objective to increase the similarity.

As an example, an adversarial loss may be calculated as follows:

$$\min_{G}\max_{D} L_{adv} = E[\log D(\phi_\theta(x), c(y))] + E[\log(1 - D(\phi_\theta(\tilde{x}), c(y)))] \quad (4)$$

where D represents a discriminator, $\tilde{x}$=G(z,c($y$)), G represents a generator, and $\phi_{74}$ ( ) represents a feature extractor on a task specific dataset. The fourth training objective is to minimize the adversarial loss to further optimize the image generation process and the codebook.

In some embodiments, in addition to using the image discrimination process to determine the similarity between the first set of synthetic images and the training image belonging to the first image class, the image class to which the first set of synthetic images belongs may be determined. Accordingly, the fourth training objective is to increase both the similarity and the accuracy of the determined image classes.

For example, a classifier head may be added to the features of a real image (for example, a training image) and a synthetic image. The generator 115 and the codebook are updated by the classification loss $L_c$ to enable the synthetic image to share the same class based semantics with the real image. In this way, in an embodiment where the generator 115 and the discriminator 155 are implemented based on the GAN, the total GAN loss may be expressed as $L_{GAN}=L_{adv}+L_C$.

An example update process is discussed below. Two levels of optimization are used in this example. The optimization framework is shown in the algorithm below.

| Algorithm Optimization Framework |
|---|
| Input: Training data $\mathcal{T}$ |
| Notation: Generator G, codebooks Z, Synthetic dataset S, Network for feature matching $\phi_\theta$ and hyperparameters λ, α are learning rates. |
| repeat |
|   Initialize network parameter $\theta_1$ |
|   for n = 1 to N do |
|     for i = 1 to M do |
|       Sample multiple z codes from \|Z\| |
|       Generate the synthetic images set $S_i$ via G |
|       Sample their associations $\mathcal{T}_i$ from $\mathcal{T}$ |
|       Compute $L_{con}$ via $\mathcal{T}_i$ and $S_i$ using $\phi_\theta$ |
|       Update (Z,G) ← (Z,G) − $\alpha\nabla_{(Z,G)}L_{con}$ |
|     end for |
|     Inner loop update θ ← θ −∇ $L_{cls}$(T) |
|   end for |
| until Converge |

In the above algorithm, in the outer loop, the following overall condensation loss may be used to update the generator G and the codebook Z: $L_{con}L_{GAN}+L_f+L_{intra}+l_{inter}$. The network $\phi_\theta$ for feature matching may be updated by a general classification loss $L_{cls}$. Different from traditional approaches, for training, $\phi_\theta$ depends on real images $|\mathcal{T}|$ rather than synthetic images |S|. Thus, during feature matching, layer statistics, such as the average value and variance generated by the synthetic image, may be aligned with the statistics of real data. In addition, this approach may align the distribution of the synthetic image with that of the real image, thereby deceiving the discriminator 155.

Generally, the generative model aims to generate realistic images, which may be included in various applications, such as image manipulation/inpainting/super-resolution, image to image conversion, object detection, and so on. On one hand, the purpose is to create images that appear realistic. The effect of the GAN generated images for training the model is comparable to that of the actual photos randomly selected. On the other hand, some approaches use GAN to generate datasets. For example, features of unseen classes may be generated for zero shop learning. Further, dataset GAN may be introduced for semantic label creation. However, the purpose is to generate a large number of training samples and/or annotate pixel labels. Although it is proposed that IT-GAN may be used to synthesize informative training samples, the number of synthetic training samples is equal to the number of samples in the original dataset. The traditional generation model does not aim to dataset condensation evaluation. Furthermore, the relationship between synthetic images is not considered.

According to some embodiments of the disclosure, the objective is to condense a small set of images via a generative model, and intra class and inter class losses may be minimized. In this way, the synthetic images are diverse and discriminative enough, so the condensed dataset is highly representative.

In some embodiments, the updated image generation process and codebook may be used to generate a condensed image set based on the image set. The condensed image set thus obtained is more advantageous than the condensed dataset obtained by traditional approaches.

In the simulation using datasets MNIST, Fashion MINIST, SVHN, CIFA10/100 and ImageNet-1K, the dataset condensation solution according to the embodiment of the disclosure is significantly superior to other condensation solutions, such as the coreset selection approaches such as Random, K-Center, Herding selection and Forgetting, and the dataset condensation approaches such as LD, DC, CAF, MTT and DSA.

The performance comparison between the solution of this disclosure and other solutions will be discussed below with reference to Tables 1 to 6.

Reference is first made to Table 1, which shows a comparison of performance (e. g., test accuracy). $LD^\dagger$ and $DD^\dagger$ use LeNet for MNIST and AlexNet for CIFAR10, and the reset uses ConvNet for training and testing. IPC represents images per class, and proportion represents the proportion of condensed images in the whole training set.

TABLE 1

| | | Ratio | Coreset Selections | | | | Condensation | |
|---|---|---|---|---|---|---|---|---|
| | IPC | % | Random | Herding | K-Center | Forgetting | $DD^+$ | $LD^+$ |
| MNIST | 1 | 0.017 | 64.9 ± 3.5 | 89.2 ± 1.6 | 89.3 ± 1.5 | 35.5 ± 3.6 | — | 60.9 ± 3.2 |
| | 10 | 0.17 | 95.1 ± 0.9 | 93.7 ± 0.3 | 84.4 ± 1.7 | 68.1 ± 3.3 | 79.5 ± 8.3 | 87.3 ± 0.7 |
| | 50 | 0.83 | 97.9 ± 0.2 | 94.8 ± 0.2 | 97.4 ± 0.3 | 88.2 ± 1.2 | — | 93.3 ± 0.3 |
| FashionMNIST | 1 | 0.017 | 51.4 ± 3.8 | 67.0 ± 1.9 | 66.9 ± 1.8 | 42.0 ± 5.5 | — | — |
| | 10 | 0.17 | 73.8 ± 0.7 | 71.1 ± 0.7 | 54.7 ± 1.5 | 53.9 ± 32.0 | — | — |
| | 50 | 0.83 | 82.5 ± 0.7 | 71.9 ± 0.8 | 68.3 ± 0.8 | 55.0 ± 1.1 | — | — |

TABLE 1-continued

| | | | | | | | | |
|---|---|---|---|---|---|---|---|---|
| SVHN | 1 | 0.014 | 14.6 ± 1.6 | 20.9 ± 1.3 | 21.0 ± 1.5 | 12.1 ± 1.7 | — | — |
| | 10 | 0.14 | 35.1 ± 4.1 | 50.5 ± 3.3 | 14.0 ± 1.3 | 16.8 ± 1.2 | — | — |
| | 50 | 0.7 | 70.9 ± 0.9 | 72.6 ± 0.8 | 20.1 ± 1.4 | 27.2 ± 1.5 | — | — |
| CIFAR10 | 1 | 0.02 | 14.4 ± 2.0 | 21.3 ± 12 | 21.5 ± 1.3 | 13.5 ± 1.2 | — | 25.7 ± 0.7 |
| | 10 | 0.2 | 26.0 ± 0.2 | 31.6 ± 0.7 | 14.7 ± 0.9 | 23.3 ± 1.0 | 36.8 ± 1.2 | 38.3 ± 0.4 |
| | 50 | 1 | 43.4 ± 1.0 | 40.4 ± 0.6 | 27.0 ± 31.4 | 23.3 ± 1.1 | — | 42 5 ± 0.4 |
| CIFAR100 | 1 | 02 | 4.2 ± 0.3 | 8.4 ± 0.3 | 8.3 ± 0.3 | 4.5 ± 0.3 | — | 13.5 ± 0.4 |
| | 10 | 2 | 14.6 ± 0.5 | 17.3 ± 0.3 | 7.1 ± 0.2 | 9.8 ± 0.2 | — | — |
| | 50 | 10 | 30.0 ± 0.4 | 33.7 ± 0.5 | 30.5 ± 0.3 | — | — | — |

| | Condensation | | | | | | Whole |
|---|---|---|---|---|---|---|---|
| | IPC | DC | DSA | CAFE | MTT | OURS | Dataset |
| MNIST | 1 | 91.7 ± 0.5 | 88.7 ± 0.6 | 93.1 ± 0.3 | — | 93.5 ± 0.9 | 99.6 ± 0.0 |
| | 10 | 97.4 ± 0.2 | 97.8 ± 0.3 | 97.5 ± 0.1 | — | 98.3 ± 0.1 | |
| | 50 | 98.8 ± 0.2 | 99.2 ± 0.1 | 98.9 ± 0.2 | — | 99.1 ± 0.1 | |
| FashionMNIST | 1 | 70.5 ± 0.6 | 70.6 ± 0.6 | 77.1 ± 0.9 | — | 79.2 ± 1.8 | 93.5 ± 0.1 |
| | 10 | 82.3 ± 0.4 | 84.6 ± 0.3 | 83.0 ± 0.4 | — | 87.3 ± 0.4 | |
| | 50 | 83.6 ± 0.4 | 88.7 ± 0.2 | 88.2 ± 0.3 | — | 88.8 ± 0.3 | |
| SVHN | 1 | 31.2 ± 1.4 | 27.5 ± 1.4 | 42.9 ± 3.0 | — | 42.8 ± 2.2 | 95.4 ± 0.1 |
| | 10 | 76.1 ± 0.6 | 79.2 ± 0.5 | 77.9 ± 0.6 | — | 79.6 ± 0.5 | |
| | 50 | 82.3 ± 0.3 | 84.4 ± 0.4 | 82.3 ± 0.4 | — | 84.4 ± 0.5 | |
| CIFAR10 | 1 | 28.3 ± 0.5 | 28.8 ± 0.7 | 31.6 ± 0.8 | 46.3 ± 0.8 | 47.6 ± 0.8 | 84.8 ± 0.1 |
| | 10 | 44.9 ± 0.5 | 52.1 ± 0.5 | 50.9 ± 0.5 | 65.3 ± 0.7 | 65.5 ± 0.5 | |
| | 50 | 53.9 ± 0.5 | 60.6 ± 0.5 | 62.3 ± 0.4 | 71.6 ± 0.2 | 71.3 ± 0.1 | |
| CIFAR100 | 1 | 12.8 ± 0.3 | 13.9 ± 0.3 | 14.0 ± 0.3 | 24.3 ± 0.3 | 25.1 ± 0.3 | 56.17 ± 0.3 |
| | 10 | 25.2 ± 0.3 | 32.3 ± 0.3 | 31.5 ± 0.2 | 40.1 ± 0.4 | 40.8 ± 0.3 | |
| | 50 | — | 42.8 ± 0.4 | 42.9 ± 0.2 | 47.7 ± 0.2 | 48.0 ± 0.2 | |

As shown in Table 1, the accuracy has been significantly improved by adopting the solution of the disclosure.

Table 2 shows the simulation results using the dataset ImageNet-1K.

TABLE 2

| | Random | FrePo | DM | Ours | Whole Dataset |
|---|---|---|---|---|---|
| 1 | 0.6 ± 0.1 | 7.5 ± 0.3 | 1.5 ± 0.1 | 7.9 ± 0.5 | 34.2 ± 0.4 |
| 2 | 0.9 ± 0.1 | 9.7 ± 0.2 | 1.7 ± 0.1 | 10.0 ± 0.6 | |
| 10 | 3.8 ± 0.1 | — | — | 17.6 ± 1.7 | |
| 50 | 15.4 ± 1.6 | — | — | 27.2 ± 1.6 | |

As shown in Table 2, other approaches are difficult to be applied to ImageNet-1K, because a large number of parameters in the synthetic images that are proportional to the number of classes and resolutions are difficult to be optimized. The generative model according to the embodiment of the disclosure may scale the dataset condensation up to ImageNet-1K with different classes and color spaces, and has better accuracy.

Table 3 shows the use of synthetic images from different generative models (for example, BigGAN, VQGAN, StyleGAN-XL, and the model of the embodiment of the disclosure) for ImageNet-1K training, and the images are adjusted to 64×64 resolution. 1, 2, 10 and 50 represent the number of images in each class.

TABLE 3

| | 1 | 2 | 10 | 50 |
|---|---|---|---|---|
| BigGAN | 0.5 ± 0.1 | 0.9 ± 0.1 | 3.7 ± 0.1 | 14.3 ± 0.9 |
| VQGAN | 0.8 ± 0.1 | 0.9 ± 0.1 | 3.8 ± 0.2 | 15.7 ± 0.8 |
| StyleGAN-XL | 0.8 | 0.9 ± 0.1 | 3.7 ± 0.1 | 15.9 ± 1.0 |
| our | 7.9 ± 0.5 | 10.0 ± 0.6 | 17.6 ± 1.7 | 27.2 ± 1.6 |

As shown in Table 3, the solution according to the embodiment of the disclosure may synthesize more informative samples for training.

Table 4 shows the generalization capability of the unseen architectures (e.g., AlexNet, VGG11, ResNet18 and MLP), where C represents a network used for condensation and T represents a network used for testing.

TABLE 4

| | C\T | ConvNet | AlexNet | VGG11 | ResNet18 | MLP |
|---|---|---|---|---|---|---|
| DC | ConvNet | 53.9 ± 0.5 | 28.77 ± 0.7 | 38.76 ± 1.1 | 20.85 ± 1.0 | 28.71 ± 0.7 |
| CAFE | ConvNet | 55.5 ± 0.4 | 34.0 ± 0.6 | 40.6 ± 0.8 | 25.3 ± 0.9 | 36.7 ± 0.6 |
| Our | ConvNet | 71.3 ± 0.3 | 53.2 ± 0.4 | 59.6 ± 0.2 | 53.9 ± 0.7 | 50.1 ± 0.5 |

As shown in Table 4, although the condensed image is generated through ConvNet feature matching in the simulation process, the solution according to the embodiment of the disclosure achieves better generalization performance on different architectures.

Table 5 shows the results of ablation studies under different classification conditions, where “one-hot” represents a regular label of each class; “Online feature” represents the image feature extracted by the network $\phi_\theta$ in the last step, so it will change during the training process; “Class features” represents the average features of each class of the solution according to the embodiments of the disclosure.

TABLE 5

| | CIFA-10 | CIFA-100 | IN-Sub |
|---|---|---|---|
| one-hot | 62.3 | 37.1 | 20.5 |
| online feature | 63.7 | 39.0 | 22.1 |
| class feature | 65.5 | 40.8 | 26.6 |

As shown in Table 5, class feature achieves the best results because they contain more information acquired from the images of each class. It provides a strong priori from different classes of original datasets, enabling the generator to learn squeezed information and synthesize informative images. Such a priori may bring more improvements to more complex datasets, such as ImageNet, which has mutual information across classes.

Table 6 shows the results of ablation studies with different input samples, where uniform sampling means that the codes are sampled uniformly in Gaussian distribution, and random sampling with threshold represents using truncation.

TABLE 6

| | CIFA-10 | CIFA-100 | IN-Sub |
|---|---|---|---|
| uniform sample | 56.0 | 30.1 | 12.2 |
| random with threshold | 56.6 | 31.4 | 12.5 |
| learnable codebooks | 65.5 | 40.8 | 26.6 |

As shown in Table 6, the approach of learnable codebook according to the embodiment of the disclosure has good performance.

Figure 4:
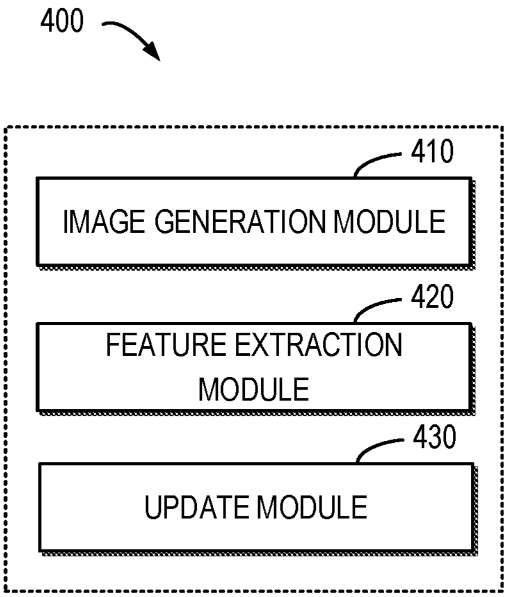
FIG. 4 shows a block diagram of an apparatus for image processing according to some embodiments of the disclosure.

FIG. 4 shows a schematic block diagram of an apparatus for image processing 400 according to some embodiments of the disclosure. The apparatus 400 may be implemented or included in the electronic device 110. Each module/component in the apparatus 400 may be implemented in hardware, software, firmware, or any combination thereof.

As shown in FIG. 4, the apparatus 400 includes an image generation module 410, a feature extraction module 420, and an update module 430. The image generation module 410 is configured to generate, using an image generation process, a first set of synthetic images based on a first set of codes in a codebook and based on a first class feature associated with a first image class, the first set of codes being associated with the first image class. The feature extraction module 420 is configured to generate, using a feature extraction process, a first set of reference features based on the first set of synthetic images and generate a first set of target features based on a plurality of sets of training images in a training image set, the plurality of sets of training images belonging to the first image class. The update module 430 is configured to update the image generation process and the codebook according to at least a first training objective to reduce a difference between each reference feature in the first set of reference features and a corresponding target feature in the first set of target features.

In some embodiments, the feature extraction module 420 may further be configured to: extract, using the feature extraction process, corresponding features from respective training image belonging to the first image class in the training image set; and generate the first class feature based on the corresponding features of the respective training images.

In some embodiments, the image generation module 410 may be configured to cascade the first class feature with a code in the first set of codes; and generate, based on the concatenated first class feature and code, a synthetic image of the first set of synthetic images.

In some embodiments, the feature extraction module 420 may be configured to generate, using the feature extraction process, a target feature in the first set of target features based on a set of training images in the plurality of sets of training images.

In some embodiments, the update module 430 may be configured to further update the image generation process and the codebook further according to a second training objective to increase differences between the first set of reference features and reduce a difference between each reference feature in the first set of reference features and the first class feature.

In some embodiments, the image generation module 410 may further be configured to generate a second set of synthetic images based on a second set of codes in the codebook and based on a second class feature associated with a second image class, the second set of codes being associated with the second image class. In some embodiments, the feature extraction module may further be configured to generate a second set of reference features based on the second set of synthetic images. The update module 430 may be configured to update the image generation process and the codebook further according to a third training objective to increase differences between the first set of reference features and the second set of reference features.

In some embodiments, the apparatus 400 may further include an image discrimination module configured to determine, use the image discrimination process, based on the first set of reference features and the first set of target features, at least similarity between the first set of synthetic images and training images belonging to the first image class in the training image set. In some embodiments, the update module 430 may be configured to update the image generation process and the codebook further according to a fourth training objective to increase at least the similarity.

In some embodiments, the image discrimination module may be configured to determine, using the image discrimination process, based on the first set of reference features and the first set of target features, the similarity and an image class, the first set of synthetic images belonging to the image class. In some embodiments, the fourth training objective for updating the image generation process and the codebook is to increase the similarity and accuracy of the image class.

In some embodiments, the apparatus may further include an image condensation module configured to generate, using the updated image generation process and the updated codebook, a condensed image set from an image set.

It should be understood that the features and effects of the process 200 discussed above with reference to FIGS. 1, 2, 3A and 3B are also applicable to the apparatus 400, and the details thereof will be omitted here. In addition, the modules included in the apparatus 400 may be implemented in various ways, including software, hardware, firmware, or any combination thereof. In some embodiments, one or more modules may be implemented using software and/or firmware, such as machine executable instructions stored on a storage medium. In addition to or as an alternative to machine executable instructions, some or all of the modules in apparatus 400 may be implemented at least partially by one or more hardware logic components. As an example, rather than a limitation, illustrative types of hardware logic components that may be used include field programmable gate arrays (FPGA), application specific integrated circuits (ASIC), application specific standards (ASSP), system on chips (SOC), complex programmable logic devices (CPLD), and so on.

Figure 5:
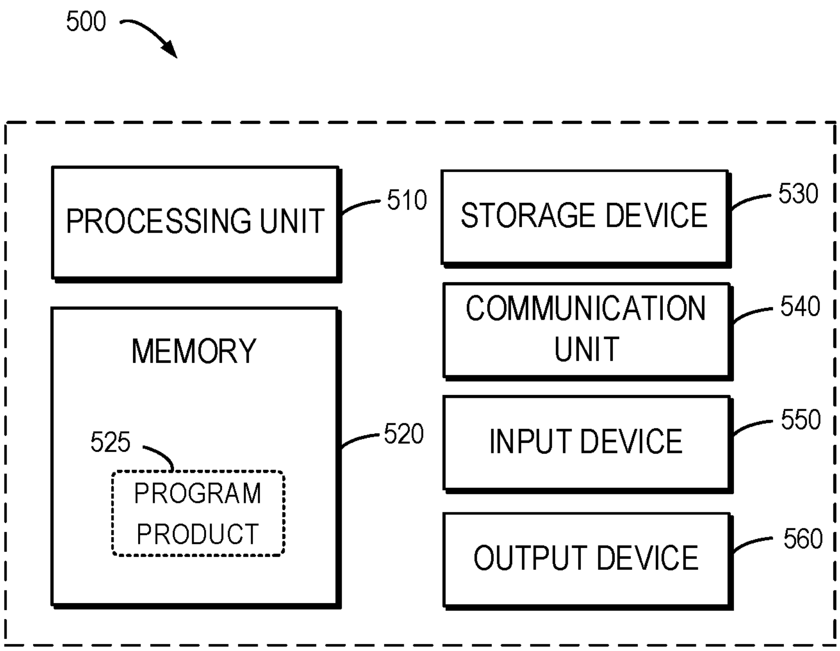
FIG. 5 shows a block diagram of a device capable of implementing various embodiments of the disclosure.

FIG. 5 shows a block diagram showing an electronic device 500 in which one or more embodiments of the disclosure may be implemented. It should be understood that the electronic device 500 shown in FIG. 5 is only an example and should not constitute any limitation on the function and scope of the embodiments described herein. The electronic device 500 shown in FIG. 5 may be used to implement the electronic device 110 in FIG. 1.

As shown in FIG. 5, the electronic device 500 is in the form of a general-purpose computing device. The components of the electronic device 500 may include, but be not limited to, one or more processors or processing units 510, a memory 520, a storage device 530, one or more communication units 540, one or more input devices 550, and one or more output devices 560. The processing unit 510 may be a physical or virtual processor and may perform various processes according to the programs stored in the memory 520. In a multiprocessor system, a plurality of processing units execute computer executable instructions in parallel to improve the parallel processing capability of the electronic device 500.

The electronic device 500 typically includes a plurality of computer storage media. Such media may be any available media accessible to the electronic device 500, including, but not limited to, volatile and non-volatile media, removable and non-removable media. The memory 520 may be a volatile memory (such as a register, a cache, a random access memory (RAM)), a non-volatile memory (such as a read-only memory (ROM), an electrically erasable programmable read-only memory (EEPROM), a flash memory), or some combinations thereof. The storage device 530 may be a removable or non-removable medium, and may include a machine-readable medium, such as a flash drive, a disk, or any other medium, which may be able to store information and/or data (such as training data for training) and may be accessed within the electronic device 500.

The electronic device 500 may further include additional removable/non-removable, volatile/non-volatile storage media. Although not shown in FIG. 5, a disk drive for reading from or writing into a removable, non-volatile disk (e. g., a "floppy disk") and an optical disk drive for reading from or writing into a removable, nonvolatile optical disk may be provided. In these cases, each drive may be connected to a bus (not shown) by one or more data medium interfaces. The memory 520 may include a computer program product 525 having one or more program modules configured to perform various methods or actions of various embodiments of the disclosure.

The communication unit 540 performs communications with other computing devices through a communication medium. Additionally, the functions of the components of the electronic device 500 may be implemented in a single computing cluster or a plurality of computing machines communicating through communication connections. Thus, the electronic device 500 may operate in a networked environment using a logical connection to one or more other servers, network personal computers (PCs), or another network node.

The input devices 550 may be one or more input devices, such as a mouse, a keyboard, a trackball, and/or the like. The output device 560 may be one or more output devices, such as a display, a speaker, a printer, and the like. The electronic device 500 may further communicate, through the communication unit 540 as required, with one or more external devices (not shown), such as storage devices, display devices, etc., with one or more devices that enable users to interact with the electronic device 500, or with any device (such as network cards, modems, etc.) that enables the electronic device 500 to communicate with one or more other computing devices. Such communications may be performed via an input/output (I/O) interface (not shown).

According to example embodiments of the disclosure, there is provided a computer-readable storage medium storing computer executable instructions thereon, where computer executable instructions are executed by a processor to implement the method described above. According to example embodiments of the disclosure, there is further provided a computer program product which is tangibly stored on a non-transitory computer-readable medium and includes computer executable instructions that are executed by a processor to implement the methods described above.

Various aspects of the disclosure are described herein with reference to flowcharts and/or block diagrams of methods, apparatuses, devices, and computer program products implemented in accordance with the disclosure. It should be understood that each block of the flow chart and/or block diagram and the combination of the blocks in the flow chart and/or block diagram may be implemented by computer-readable program instructions.

These computer-readable program instructions may be provided to a processing unit of a general purpose computer, a special purpose computer or other programmable data processing device, thereby producing a machine such that when these instructions are executed through a processing unit of a computer or other programmable data processing device, they generate a device that performs the functions/actions specified in one or more blocks in the flow chart and/or block diagram. These computer-readable program instructions may further be stored in a computer-readable storage medium, which enables a computer, a programmable data processing apparatus, and/or other devices to operate in a specific manner. Thus, a computer-readable medium storing instructions includes a manufacture, which includes instructions to implement various aspects of functions/actions specified in one or more blocks in a flowchart and/or block diagram.

Computer readable program instructions may be loaded onto a computer, other programmable data processing apparatuses, or other devices, so that a series of operating steps may be performed on the computer, other programmable data processing apparatuses, or other devices to generate a computer implemented process, thereby causing instructions executed on the computer, other programmable data processing apparatuses or other devices to perform the functions/actions specified in one or more blocks in the flow chart and/or block diagram.

The flow charts and block diagrams in the accompanying drawings show possible architectures, functions, and operations of systems, methods, and computer program products in accordance with implementations of the disclosure. In this regard, each block in a flowchart or block diagram may represent a part of a module, a program segment or instructions, and the part of the module, the program segment or the instructions contains one or more executable instructions for implementing a specified logical function. In some alternative implementations, the functions indicated in the block may also occur in a different order from those indicated in the drawings. For example, two consecutive blocks may actually be executed basically in parallel, and they may sometimes be executed in a reverse order, depending on the function involved. It should also be noted that each block in the block diagram and/or flow diagram, as well as the combination of blocks in the block diagram and/or flow diagram, may be implemented with a dedicated hardware-based system that performs a specified function or action, or may be implemented with a combination of dedicated hardware and computer instructions.

The individual implementations of the disclosure have been described above, and the above descriptions are example, not exhaustive, and is not limited to the disclosed implementations. Without deviating from the scope and spirit of the individual implementations described, many modifications and changes are obvious to ordinary technicians in the art. The choice of terms used herein is intended to best explain the principles, practical applications or improvements of industry technologies of each implementation, or to enable other ordinary technicians in the art to understand each implementation disclosed herein.

What is claimed is:

1. A method of image processing of image processing, comprising:

generating, using an image generation process, a first set of synthetic images based on a first set of codes in a codebook and based on a first class feature associated with a first image class, the first set of codes being associated with the first image class;

generating, using a feature extraction process, a first set of reference features based on the first set of synthetic images and generating a first set of target features based on a plurality of sets of training images in a training image set, the plurality of sets of training images belonging to the first image class; and updating the image generation process and the codebook according to at least a first training objective to reduce a difference between each reference feature in the first set of reference features and a corresponding target feature in the first set of target features.

2. The method according to claim 1, further comprising:

extracting, using the feature extraction process, corresponding features from respective training images belonging to the first image class in the training image set; and generating the first class feature based on the corresponding features of the respective training images.

3. The method according to claim 2, wherein generating the first class feature comprises:

determining an average value of the corresponding features of the respective training images as the first class feature.

4. The method according to claim 1, wherein generating the first set of synthetic images comprises:

cascading the first class feature with a code in the first set of codes; and generating, based on the concatenated first class feature and code, a synthetic image of the first set of synthetic images.

5. The method according to claim 1, wherein generating the first set of target features comprises:

generating, using the feature extraction process, a target feature in the first set of target features based on a set of training images in the plurality of sets of training images.

6. The method according to claim 1, wherein updating the image generation process and the codebook comprises:

updating the image generation process and the codebook further according to a second training objective to increase differences between the first set of reference features and reduce a difference between each reference feature in the first set of reference features and the first class feature.

7. The method according to claim 1, further comprising:

generating, using the image generation process, a second set of synthetic images based on a second set of codes in the codebook and based on a second class feature associated with a second image class, the second set of codes being associated with a second image class; and generating a second set of reference features based on the second set of synthetic images, wherein the image generation process and the codebook are further updated according to a third training objective to increase differences between the first set of reference features and the second set of reference features.

8. The method according to claim 1, further comprising:

determining, using the image discrimination process, based on the first set of reference features and the first set of target features, at least similarity between the first set of synthetic images and training images belonging to the first image class in the training image set, wherein the image generation process and the codebook are further updated according to a fourth training objective to increase at least the similarity.

9. The method according to claim 8, wherein determining at least the similarity comprises:

determining, using the image discrimination process, based on the first set of reference features and the first set of target features, the similarity and an image class, the first set of synthetic images belonging to the image class, wherein the fourth training objective for updating the image generation process and the codebook is to increase the similarity and accuracy of the image class.

10. The method according to claim 1, further comprising:

generating, using the updated image generation process and the updated codebook, a condensed image set from an image set.

11. An electronic device, comprising:

at least one processor; and at least one memory coupled to the at least one processor and storing instructions for execution by the at least one processor, the instructions, upon the execution by the at least one processor, causing the device to perform acts comprising:

generating, using an image generation process, a first set of synthetic images based on a first set of codes in a codebook and based on a first class feature associated with a first image class, the first set of codes being associated with the first image class;

generating, using a feature extraction process, a first set of reference features based on the first set of synthetic images and generating a first set of target features based on a plurality of sets of training images in a training image set, the plurality of sets of training images belonging to the first image class; and updating the image generation process and the codebook according to at least a first training objective to reduce a difference between each reference feature in the first set of reference features and a corresponding target feature in the first set of target features.

12. The method according to claim 11, wherein the acts further comprise:

extracting, using the feature extraction process, corresponding features from respective training images belonging to the first image class in the training image set; and generating the first class feature based on the corresponding features of the respective training images.

13. The method according to claim 11, wherein generating the first set of synthetic images comprises:

cascading the first class feature with a code in the first set of codes; and generating, based on the concatenated first class feature and code, a synthetic image of the first set of synthetic images.

14. The method according to claim 11, wherein generating the first set of target features comprises:

generating, using the feature extraction process, a target feature in the first set of target features based on a set of training images in the plurality of sets of training images.

15. The method according to claim 11, wherein updating the image generation process and the codebook comprises:

updating the image generation process and the codebook further according to a second training objective to increase differences between the first set of reference features and reduce a difference between each reference feature in the first set of reference features and the first class feature.

16. The method according to claim 11, wherein the acts further comprise:

generating, using the image generation process, a second set of synthetic images based on a second set of codes in the codebook and based on a second class feature associated with a second image class, the second set of codes being associated with a second image class; and generating a second set of reference features based on the second set of synthetic images, wherein the image generation process and the codebook are further updated according to a third training objective to increase differences between the first set of reference features and the second set of reference features.

17. The method according to claim 11, wherein the acts further comprise:

determining, using the image discrimination process, based on the first set of reference features and the first set of target features, at least similarity between the first set of synthetic images and training images belonging to the first image class in the training image set, wherein the image generation process and the codebook are further updated according to a fourth training objective to increase at least the similarity.

18. The method according to claim 17, wherein determining at least the similarity comprises:

determining, using the image discrimination process, based on the first set of reference features and the first set of target features, the similarity and an image class, the first set of synthetic images belonging to the image class, wherein the fourth training objective for updating the image generation process and the codebook is to increase the similarity and accuracy of the image class.

19. The method according to claim 11, wherein the acts further comprise:

generating, using the updated image generation process and the updated codebook, a condensed image set from an image set.

20. A non-transitory computer-readable storage medium storing a computer program thereon, the computer program being executed by a processor to perform actions comprising:

generating, using an image generation process, a first set of synthetic images based on a first set of codes in a codebook and based on a first class feature associated with a first image class, the first set of codes being associated with the first image class;

generating, using a feature extraction process, a first set of reference features based on the first set of synthetic images and generating a first set of target features based on a plurality of sets of training images in a training image set, the plurality of sets of training images belonging to the first image class; and updating the image generation process and the codebook according to at least a first training objective to reduce a difference between each reference feature in the first set of reference features and a corresponding target feature in the first set of target features.

* * * * *